May 18, 1971 T. O. PAINE 3,579,412
ADMINISTRATOR OF THE NATIONAL AERONAUTICS
AND SPACE ADMINISTRATION
FLUID IMPERVIOUS BARRIER INCLUDING LIQUID METAL ALLOY
AND METHOD OF MAKING SAME
Filed May 29, 1968
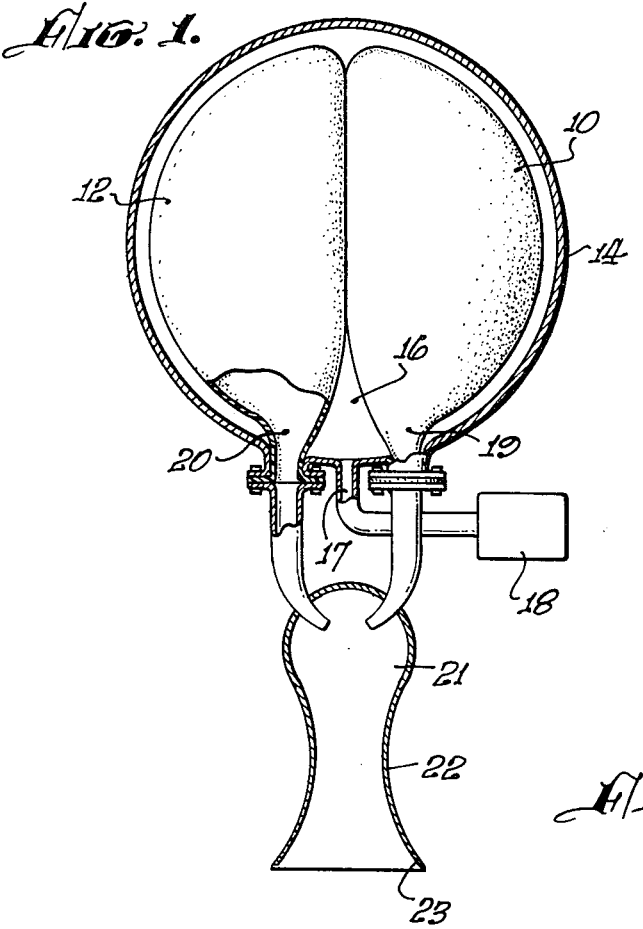
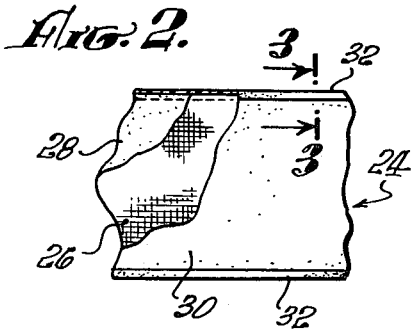
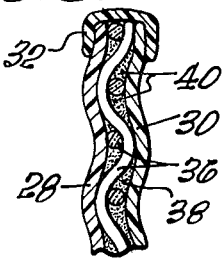
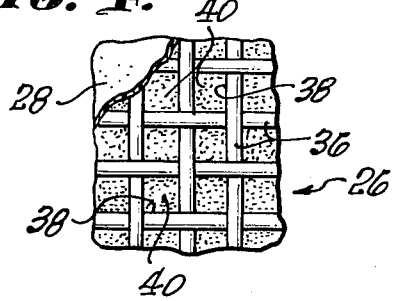
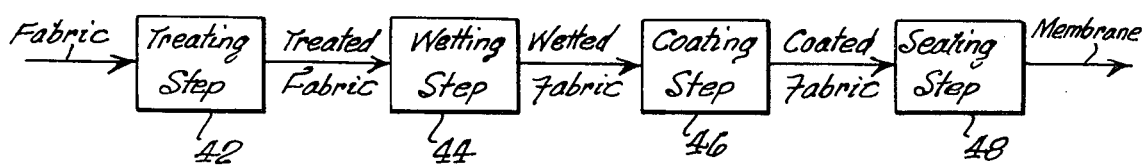
INVENTOR.
ALBERT J. BAUMAN,
By
ATTORNEYS.

United States Patent Office 3,579,412
Patented May 18, 1971

---

3,579,412
FLUID IMPERVIOUS BARRIER INCLUDING LIQUID METAL ALLOY AND METHOD OF MAKING SAME
T. O. Paine, Administrator of the National Aeronautics and Space Administration, with respect to an invention of Albert J. Bauman, Sierra Madre, Calif.
Filed May 29, 1968, Ser. No. 732,922
Int. Cl. D06q 1/04
U.S. Cl. 161—89      15 Claims

ABSTRACT OF THE DISCLOSURE

A flexible barrier membrane comprising a porous substrate and incorporated liquid metal provides structures highly impervious to gases and liquids, and self-sealing to small punctures. Fabrics of metal or synthetic textile are impregnated with low melting alloys, such as alloys of gallium or indium metal, and used as sealant barriers for spacecraft walls and as flexible membrane barriers for pumping liquid propellants.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

This invention relates generally to flexible barrier structures, and more particularly to thin flexible barriers and membranes incorporating liquid metals and having unique properties such as total imperviousness to gases and liquids, chemical resistance to corrosive materials, and resistance to small punctures.

(2) Description of the prior art

Prior to the present invention, there was no known teaching or appreciation of the unique flexible impervious structure that results when low melting liquid metal is impregnated and retained on a porous substrate. There has likewise been no known prior art process whereby completely liquid low melting alloys were impregnated uniformly on a porous substrate.

Prior art barriers did not achieve flexibility if fabricated of sheet metal, or were not impervious if fabricated of flexible non-metallic materials such as plastics and rubber. Barriers comprised of rubber were also unsatisfactory due to the swelling which occurs upon contact with liquid chemicals and fuels, and due to the general lack of chemical resistance of known rubber materials.

Prior art laminated barriers combining thin metal foils with flexible non-metallic sheets were difficult to fabricate, were subject to immediate cracking during use, were deficient in terms of gas and liquid permeability and did not provide structures capable of reuse after flexing.

U.S. Pat. No. 1,551,081 discloses porous substrates impregnated with tin alloys. However the result was a composite of extreme rigidity and wholly unsuitable for expulsion bladder and other applications were flexibility and imperviousness to gases and liquids under pressure are essential. The impregnated barriers of the present invention overcome the above prior art deficiencies by providing flexible structures which are corrosion resistant, impervious to gases and self sealing to small punctures.

The deficiencies of prior art flexible barrier structures have been particularly serious in terms of membranes for use as the flexible expulsion bladders of liquid propellant fuel systems. Basic requirements for such barrier membrane include complete imperviousness to the pressurizing gas utilized to collapse the bladder, and resistance to the highly corrosive and oxidizing liquid propellant oxidizer materials contained in the fuel tank. In a typical cycle of operation pressurized gas collapses and flattens the bladder against the walls of the fuel tank thereby expelling liquid propellant. Prior art expulsion bladders have exhibited creasing, stretching, or shrinking during some stage of the expulsion process. As a result, it has not been possible to achieve satisfactory service life and reliability during multiple expulsion and filling cycles. Typical fuel oxidizers attack most known flexible polymers, with the exception of certain fluorinated polymeric materials. The prior art has attempted to utilize polymerized tetrafluoroethylene and fluorinated ethylene-propylene which are commercially available under the trademark "Teflon." When formed into membranes these materials are reasonably flexible and resistant to corrosive propellant materials, but they have the defect of microporosity and are not impervious to propellant liquid, nor to pressuring gas. Consequently, it has not been possible heretofore to fabricate a satisfactory barrier membrane for the flexible expulsion bladders of propellant fuel tanks.

When the usual types of barrier materials are sought to be used as sealing liners for the walls of rocket and missile cases and spacecraft, the amount of micrometeoroid penetration through the walls may be sufficiently large to cause leakages, breakdown, or otherwise prevent prolonged exposure to the space environment. In any event, for obtaining satisfactory long duration space flights it is desirable to eliminate leakage from rocket cases and loss of cabin atmosphere by providing barriers self-sealing to punctures and generally impervious to gases and other fluids.

Accordingly, an object of the invention is the provision of a novel and improved barrier structure which is compatible with and impervious to fluid materials.

Another object of the invention is the provision of a barrier structure which is completely impervious to pressurized gases.

Yet another object of this invention is the provision of a novel and improved flexible membrane suitable for use in contact with stored reactive chemicals and propellant fuels.

A further object of the invention is the provision of a novel and improved light weight barrier structure which resists penetration by micrometeroid particles and by the other high energy particles present in space environments.

SUMMARY OF THE INVENTION

The above and other objects of this invention are accomplished by a barrier arrangement comprising a structural base component and a metal sealant component suitably contained in the base, such that all pores and openings of the base are sealed by metal in the liquid state. Briefly the structural base of the barrier may be any flexible or woven or porous resilient substrate, either metallic or non-metallic. The metal sealant component may be any metal or mixture of metals having a melting point below the temperature at which the barrier is to be used. The resulting barrier structure having liquid metal effectively sealing the pores of the structural base exhibits flexibility characteristics usually associated with membranes, and consequently may be termed a "membrane." It will be understood however that the term "membrane" as used in the specification and appended claims refers to a fluid impervious barrier, and not to a semi-permeable membrane-like barrier.

The barrier structures and membranes of the present invention have previously unavailable combinations of characteristics, both physical and chemical, quite distinct from those normally associated with the structural base component or the liquid metal component alone. Surprisingly it has been found that the liquid metal component adheres tenaciously to the structural component providing a permanent sealant barrier. While not bound by any theory, it is believed that the typical high surface tension of the low melting point liquid metals utilized in the invention provides this reliable permanent sealing of essentially all of the micropores and other void spaces present in the typically porous structural base. In addition these barrier membrane structures have been found to have the unexpected property of being self-sealing with respect to small punctures.

Another embodiment of the invention utilizes thin cover sheets of flexible polymeric material, or the like, on one or both faces of the membrane, as is more fully explained below. The present invention also comprehends the novel methods of preparation of the barrier membrane structures.

The novel features that are considered characteristic of this invention are set forth with particularity in the appended claims. The invention itself, both as to its arrangement and methods of preparation and operation, as well as additional objects and advantages thereof, will best be understood from the subsequent description when read in connection with the accompanying drawings, which form a part of the specification.

BRIEF DESCRIPTION OF DRAWINGS

FIG. 1 is a schematic representation of a rocket assembly having bladder membranes in accordance with this invention;

FIG. 2 is a plan view, partially broken away, of a portion of a membrane barrier in accordance with this invention;

FIG. 3 is a fragmentary sectional view, on an enlarged scale, taken genearlly along line 3—3 of FIG. 2;

FIG. 4 is a fragmentary detail view, on an enlarged scale of the membrane barrier of FIG. 2; and FIG. 5 is a flow diagram schematically illustrating a process of making the membrane barrier material of this invention.

DESCRIPTION OF PREFERRED EMBODIMENTS

Referring now to the drawings, FIG. 1 is an exemplary schematic view illustrating a rocket assembly in which the two flexible storage and pumping bladders 10 and 12, each substantially hemispherical in shape, are housed in a rigid, generally spherical tank 14, the bladders being spaced to provide a pressure chamber 16. One bladder contains a rocket fuel, for example hydrazine; the other contains an oxidizer such as anhydrous liquid nitrogen tetroxide. An inlet 17 provides for the introduction of a pressurized fluid from a source 18 into chamber 16 for the purpose of expelling the contents of the bladders through the outlets 19 and 20. The outlets are connected by suitable means shown only schematically, with the combustion chamber 21 of a rocket engine comprising nozzle 22 and jet orifice 23.

In accordance with this invention, each of the bladders 10 and 12 is fabricated of material of the type illustrated in FIGS. 2 to 4. FIG. 2 shows a laminar membrane 24 comprised of an impervious layer 26, a coating or cover sheet 28 on one side and another coating or cover sheet 30 on the other side. The edges of the membrane, optionally are sealed by means of a suitable sealing tape 32, or the like, bonded to both cover sheets 28 and 30. As indicated in FIGS. 3 and 4, base layer 26 many be formed of a fabric or textile composed of multidirectionally disposed fibers or fibrils 36, metallic or non-metallic, having inherent voids or pores 38. Base 26 is pretreated, if necessary by chemical materials or other means to make its surface wettable by a liquid metal 40 with which base 26 is then treated. Metal 40 has a low enough melting point to be liquid at the operational temperature at which the membrane material is to be used and has a relatively high surface tension. Voids or pores 38 are thus filled with the liquid metal alloy so as to produce, in effect, a permanent stable liquid metal bearing membrane impervious to gases and liquids.

With further reference to FIG. 1, which illustrates a typical manner of storing chemical rocket propellants, it will be observed that the introduction of pressurizing fluid from source 18 into chamber 16 serves to drastically alter the initial configuration of bladders 10 and 12 and ultimately flatten these against the walls of tank 14 in the expulsion and pumping step. Thus it is apparent that expulsion is accompanied by considerable folding and irregular creasing of bladders 10 and 12, particularly when operating over a number of expulsion-filling cycles. When bladders 10 and 12 were fabricated from the barrier membranes of the present invention they were found to be resistant to the strains and other damaging effects of such folding and creasing, and to retain satisfactory flexibility after repeated cycling. In addition the present barried membrane materials were found to be resistant to strong chemicals, and compatible with conventional fluid propellants.

Various types of metallic and non-metallic materials may be employed as the flexible structural base of the barrier. The substrate may comprise a woven mesh of discrete wires, as in a conventional screen, but preferably comprises an arrangement of fine fibers suitably interlocked in the more intricate manner of fabrics and textiles. Conventional woven glass cloth and synthetic and natural textile fabric may be utilized as well as fused quartz and carbon-bearing cloth and any of the metallic fabric materials which recently have become commercially available. Suitable microporous plastic fabrics may also be employed as the substrate of the present barrier structure. Generally speaking the degree of flexibility of the substrate determines the flexure properties of the final barrier. This flexibility factor and the desired degree of high temperature stability are typical factors in volved in the choice of substrate under the present invention. For example, in a high temperature gas environment, the substrate may be a metal mesh fabric woven of fibrils made from a nickel-chromium alloy, consisting essentially of 74% nickel, 20% chromium, 3% aluminum and 3% iron, plus small percentages of other alloying elements, which is commercially available under the trade name "Chromel-R."

Another suitable alloy of nickel and chromium is available under the trade name "Rene 41." Metal fabric woven of fibrils of cobalt-chromium alloys such as the material commercially available under the trade name "Elgiloy" may also be employed. Alternately the substrate may be a mesh-like fabric formed of ribbon-shaped fibrils of nickel or alloys of nickel and chromium, and the like. Composite fabrics which interlock or otherwise combine strands of metal with synthetic textile materials, wool, silk, and the like, are also suitable in the practice of the invention.

In certain cases it has been found possible to employ fabrics of synthetic textiles such as rayon as the entire substrate, but preferably these materials are treated with a conventional inorganic phosphate flameproofing agent, such as diammonium hydrogen phosphate, and the like.

Suitable substrates may also be of asbestos, graphite and carbon, as well as fabrics obtained by the controlled charring of synthetic textile fabrics such as rayon at elevated temperatures. Various commercial vitreous and leached glass fiber fabrics are suitable but preferably a glass fiber having a silica content of about 95 to 100% which does not stiffen or otherwise change in physical flexibility between about 0 degrees and 1000 degrees centigrade is employed.

Although the invention has been described as typically employing a metal or textile fabric base, many types of flexible porous material can be used. For example, plastic films fabricated as described in "Porous Sprayed Sheets and Coatings" in Industrial and Engineering Chemistry, 57 (4), pages 38–42 (1965) typically contain voids or pores and can be treated in accordance with this invention with a low-melting liquid metal alloy which fills the pores, producing an impervious barrier.

Plastic materials may also be utilized as coatings on the filaments of a glass or quartz fabric substrate, or as a coating on metals such as the nickel and chromium alloy fibrils previously mentioned. Coatings of nylon on a metal fibril, for example, are advantageous both in the weaving and fabrication of the substrate, and in achieving impregnation of the substrate with liquid metal.

In accordance with the present invention it is desirable that the substrate be of such a nature that it is readily wettable by the selected liquid metal, or can be treated to make it wettable. Such treatment ordinarily comprises thoroughly cleaning the surface of the substrate or base material by physical and chemical techniques. Virtually all solid metals, glasses, and fused quartz can be rendered wettable to liquid metals by such treatment, as is more fully set out hereinafter. Certain plastic materials also require cleaning treatment or plating with a thin film of solid metal. With proper selection and preparation of base materials, the liquid metal ordinarily fully wets the porous substrate so as to flow over and cover all outer surfaces as well as completely filling the pores of the materials.

For certain applications, as for example where the barrier will undergo service in contact with chemically reactive liquids it is desirable to provide thin cover sheets of flexible plastic material, or the like, on one or both faces of the barrier. When two cover sheets are used, they are preferably sealed to each other over the edges of the barrier. Such cover layers may be very thin and still provide useful protection for the substrate and for the liquid metal with which it is impregnated. Available liquid metals are chemically inert to many fluids that are difficult to retain with conventional flexible membranes. Under such conditions the cover material need not be completely impervious to contacting fluids, since the metal-impregnated base will provide an adequate barrier. Such cover sheets also are advantageous in allowing the barrier to be folded back upon itself or rolled for storage, and in certain cases will increase the pressure differential that the barrier structure or membrane can withstand. The cover sheets provide an additional working thickness of material which frequently facilitates the fabrication, testing and installation of barrier materials of the present invention in structural walls of spacecraft and the like.

Turning now to FIG. 5, an illustrative process for making the laminar membrane 24 will be described. The selected fabric or other microporous base material first undergoes process step 42, which comprises cleansing for the purpose of removing from the material any coating of oxide, grease, oil, wax or other contaminant, in order to present a clean surface for wetting by a liquid metal alloy. Metallic base materials are typically treated in the vapors of boiling nitric acid, for example, while glass fibers may be washed with a solution of sulfuric acid and dichromate. The Metals Finishing Guidebook Directory (1965), published by Metals and Plastics Publications, Inc., Westwood, N.J., contains information on additional methods of treating different materials, including techniques for electroless plating of metal films on plastic surfaces, for example.

During the wetting step 44, a selected liquid metal or alloy is applied to the treated base material and intimately contacted with it, as by immersion or in any other desirable manner, to wet all surfaces of the base material, including the walls of the pores or voids, so as to fill such pores or voids.

Most low melting liquid metals have high surface tension and possess good wetting capabilities for other substrate metals when both surfaces are clean. In particular gallium and indium, and alloys of these metals, exhibit good wetting capability for dissolving the oxide coat of many metals. Such alloys also wet glass fibers and carbon as well as synthetic textiles, wool, cotton and the like. Other materials may be wetted by suitably coating or plating them with metals, for example by techniques as are outlined in the aforementioned Metals Finishing Guidebook Directory.

Although many low melting alloys are well known and are suitable for use in the present invention, the following table lists by way of illustration a few specific alloys that include appreciable or dominant proportions of indium or gallium or both. These alloys have low melting points and boiling points of the order of 1,000° C., and are particularly convenient and effective for the present purposes.

LIQUID METAL ALLOYS

| Alloy | | Percent composition | Melting point, °C. |
|---|---|---|---|
| A | Sn | 12.5 | 10.8 |
|   | In | 17.6 |   |
|   | Ga | 69.8 |   |
| B | Sn | 16 | 10.7 |
|   | Sn | 16 |   |
|   | In | 21.5 |   |
|   | Ga | 62.5 |   |
| C | Bi | 32.5 | 60.5 |
|   | Sn | 16.5 |   |
|   | In | 51.0 |   |
| D | Bi | 40.63 | 41.5 |
|   | Pb | 21.9 |   |
|   | Sn | 10.55 |   |
|   | Cd | 8.0 |   |
|   | In | 17.95 |   |
|   | Ga | 0.98 |   |

Coating step 46 is employed to apply cover sheets 28 and 30 to both faces of the wetted fabric. Two such sheets may be rolled on simultaneously or applied in any suitable manner. At least the inner face of each cover sheet is preferably readily wettable by the liquid metal filling the base pores. Each cover sheet may consist of a thin layer, for example about 0.001 inch thick, of suitable plastic, such as "Teflon," hereinbefore mentioned, or a plastic film of vinylidence chloride polymers, available commercially under the trademark, "Saran Wrap-S." Again, resort may be had to the technique in the Metals Finishing Guidebook Directory for suitable coating or plating of the cover sheet to insure its wetting by the alloy in the wetted fabric. Although the plastic layer may be microporous, it is believed that the liquid alloy fills the pores.

The sealing step 48, which follows coating step 46, seals together the edges of the two cover sheets 28 and 30 along any exposed edge of the membrane. One method by which that may be done is to seal these edges with tape 32 as shown in FIG. 3. Strips of a suitable heat-sealable film tape 32 are heat bonded to cover sheets 28 and 30. Alternatively, sheets 28 and 30 may extend beyond the edges of the wetted fabric and be directly sealed together, as by polymerization, adhesive, heat sealing or any suitable technique, thus eliminating the necessity for sealing tape 32.

While the process has been described with particular reference to making a flat sheet which may be of single sandwich construction, it will be appreciated that it may be appropriately modified to produce barriers of several layers or of other shapes as well. Also, a large sheet of the membrane structure may be cut to desired shape and the edges then sealed. A seamless structure such as the expulsion bladder membrane already described may be made by first applying one plastic cover sheet to a mandrel suitably treated with a mold release material, then adding the wetted fabric base and, lastly, applying the other cover sheet. Direct spraying of the mandrel with polymeric material may also be employed to form cover sheet layers.

In preparing the sealant barriers of the present invention it may be desirable to clean and treat the substrate as in step 42 and wet with liquid metal as in step 44 without further coating or sealing of the resulting structure, as is set out in Example 1. The examples which follow are intended to illustrate but not otherwise limit aspects of the present invention.

EXAMPLE I

This example illustrates a process for preparing a particular barrier material without external cover sheets.

A 12 inch by 12 inch square of metal mesh fabric woven of fibrils made from the 74% nickel, 20% chromium alloy commercially available under the trade name "Chromel-R" was transferred to the upper hot vapor zone of a vessel having a quantity of boiling concentrated nitric acid in the lower portion of the vessel. The metal fabric was removed with tongs, cooled, rinsed in distilled water and oven dried at 125° C. for about ten minutes. The cleaned fabric was dipped into a tray filled with a quantity of liquid metal alloy containing about 69.8% gallium, 17.6% indium and 12.5% tin. The fabric was removed, freed of excess metal by passing between rubber rollers, and mounted on a frame. When small nails and hypodermic needles were passed through the barrier and then removed, it was observed that the resulting puncture was rapidly resealed by movement of liquid metal from the area adjacent to the puncture.

Vapor pressure measurements at room temperature, at 100° C., and at 500° C. showed no significant vapor pressure attributable to metal components.

EXAMPLE II

This example illustrates a process for preparing a barrier material with external cover sheets.

The procedure of Example I was repeated through the step of dipping fabric in liquid metal. The impregnated fabric was further brushed with a clean paint brush previously dipped in liquid metal, and excess metal removed by wiping with a rubber blade. The impregnated fabric was then bonded between plastic sheets of polymerized fluorinated ethylene-propylene available commercially as "Teflon (FEP)."

A sample of this barrier material was supported on a perforated steel disc for testing in a steel permeation cell. The test showed the barrier material to be completely impervious to helium at 85 p.s.i. of helium in the cell over a period of three days at 25° C. in a Veeco MS–9 mass spectrometer leak detector. Under test conditions the sensitivity to helium of this leak detector is about $10^{-12}$ atm./sec.

After completion of this test, the sample of barrier material was removed from the test cell and folded ten times through 360° across its center. A subsequent leak test on the thus folded sample again showed no leakage.

The barriers of this invention display excellent chemical resistant properties and are thermally resistant. Thus they find utility wherever chemically and thermally resistant barriers are required. For example, these barriers provide improved structural liners and inner walls for spacecraft. The self sealing characteristics provide protection against micrometeorite penetration. The radiation resistant characteristics make these barriers particularly suited for use as shielding about the living quarters of spacecraft. In such applications a suitable liquid metal impregnated barrier of about 0.50 inch thickness has cosmic particle shielding and radiation resistance characteristics comparable to barriers of lead or steel or alloys of these metals of considerably greater thickness and weight.

The membrane structures of the invention are useful as flexible expulsion bladders or diaphragms which separate fluids in storage tanks from each other and from a pressurized gas that is introduced to expel the fluid. Such expulsion bladders are useful in the laboratory for handling a wide variety of chemical liquids and gases, and have found important application for feeding liquid rocket propellants to rocket combustion chambers.

The flexible barriers of the present invention which have a low vapor pressure and self sealing properties are suitable for use as the injection septum or membrane of gas chromatography systems. In this application hollow needles are used to introduce a gas sample into the test chamber by puncturing the membrane. With barriers formed preferably as in Example I it has been found that the puncture closes immediately after the needle is withdrawn. Similarly these barriers may be employed in mass spectrograph injection systems.

The flexible barriers of the invention may also be formed into diaphragms and utilized wherever conventional pressure sensitive diaphragms are specified. The membranes and diaphragms may also be formed into gaskets and the like, and are particularly useful in environments exposed to high energy radiation in view of the resistance of the liquid metal to radiation damage. When such diaphragms and gaskets are incorporated into space vehicles they have the further advantage of being self sealing with respect to microscopic meteorite punctures.

Thus there is provided a flexible barrier with unique impervious properties and self sealing capability which is useful in various environments and a variety of applications. Obviously many other modifications and variations of this barrier invention and the method of forming such barrier as hereinbefore set forth may be made without departing from the spirit and scope thereof. Accordingly only those limitations should be imposed as are indicated in the appended claims. For example, the invention is not limited to a fabric substrate with interlocked fibrils but includes spiral filament wound substrates, perforated, etched and ruled plates, screens and the like.

What is claimed is:

1. In a rocket propellant storage and expulsion system, a barrier contacting and confining said propellant and comprising, in combination,
    a flexible layer of porous material adapted to be wetted by a liquid metal; and
    a liquid metal alloy that is liquid at normal temperatures wetting said porous material and filling the pores thereof and rendering the same impervious to said propellant.

2. A barrier according to claim 1 wherein:
    said porous material comprises fibers multi-directionally disposed and defining pores therebetween; and
    said liquid metal alloy comprises a liquid alloy of metals selected from the group consisting of bismuth, gallium, indium, lead and tin.

3. A barrier according to claim 1 and further comprising:
    a flexible cover sheet on at least one face of the layer of wetted material.

4. A barrier according to claim 3 wherein:
    said cover sheet comprises fluorinated ethylenepropylene.

5. In a flexible, fluid impervious membrane, that improvement which comprises:
    a flexible layer of porous material capable of being wetted by a liquid metal alloy; and
    a liquid metal alloy that is liquid at normal temperatures wetting said porous material and filling the pores thereof and rendering the same impervious to fluids.

6. A membrane according to claim 5 wherein:
    said liquid metal alloy comprises a metal alloy containing as a principal ingredient a metal selected from the group consisting of gallium and indium.

7. A membrane according to claim 6 wherein:
    said alloy consists essentially of about 60 to 75% gallium, about 15 to 25% indium and about 10 to 25% tin.

8. A membrane according to claim 5 wherein:
said liquid metal alloy comprises a metal alloy selected from the group consisting of
   (a) alloys consisting essentially of gallium, indium and tin; and
   (b) alloys consisting essentially of indium, tin and bismuth.

9. A membrane according to claim 5, further comprising:
two layers of flexible matter intimately contacting the respective faces of said wetted material.

10. The membrane according to claim 9 wherein:
each of said layers of flexible matter comprises a film of polymerized tetrafluoroethylene.

11. A membrane according to claim 5 wherein:
said porous material comprises fibers multi-directionally disposed and defining pores therebetween, and said liquid metal wets said fibers and fills said pores.

12. A membrane according to claim 11 wherein:
said fibers are non-metallic.

13. A membrane according to claim 11 wherein:
said porous material comprises metallic fibrils woven into a mesh fabric.

14. A method of making a flexible, self-sealing, fluid impervious membrane, comprising the steps of:

(a) treating a flexible porous material to render it wettable by a liquid metal alloy; and
(b) wetting the treated material with a metal alloy that is liquid at normal temperatures to fill the pores in the material.

15. A method according to claim 14, further comprising the step of:
(c) applying a cover layer of solid flexible material to each of the faces of said wetted material.

References Cited
UNITED STATES PATENTS

| | | | |
|---|---|---|---|
| 1,551,081 | 8/1925 | Wight | 161—96 |
| 3,236,476 | 2/1966 | White | 117—126GA |
| 3,408,453 | 10/1968 | Shelton | 161—189 |
| 3,458,374 | 7/1969 | Shobert | 161—189 |
| 3,497,377 | 2/1970 | Allingham | 117—35 |

ROBERT F. BURNETT, Primary Examiner

J. J. BELL, Assistant Examiner

U.S. Cl. X.R.

92—92; 117—94, 126, 160; 150—.5; 161—92, 93, 95, 189, 404, 405